May 16, 1950 — F. B. BROWN — 2,507,498
VALVE ACTUATING MEANS FOR HYDRAULIC NOMOGRAPHIC MULTIPLIERS
Filed June 21, 1945 — 2 Sheets-Sheet 2

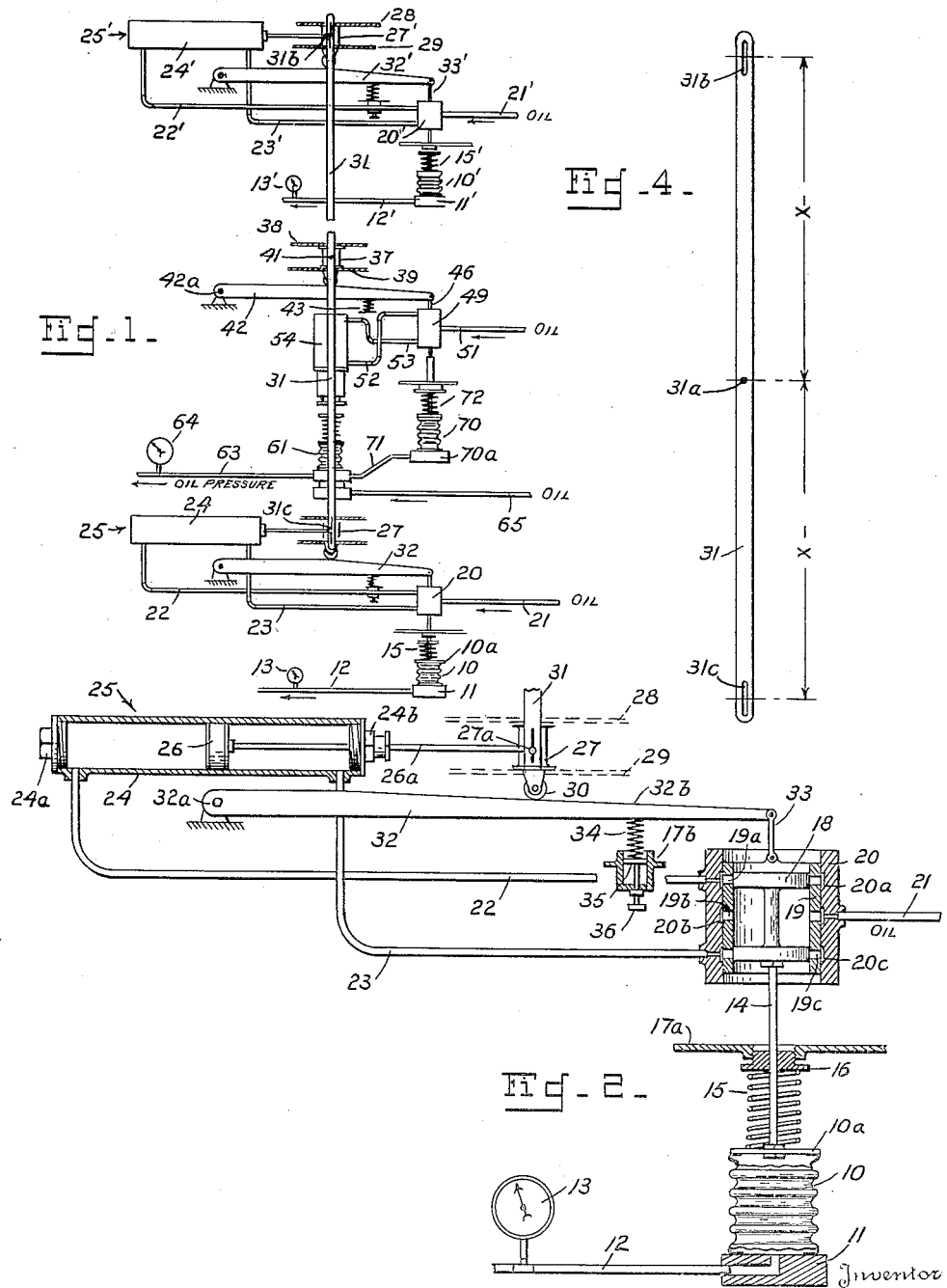

Inventor
Francis B. Brown
By C. E. Herstrom & W. E. Thibodeau
Attorneys

Patented May 16, 1950

2,507,498

UNITED STATES PATENT OFFICE 2,507,498

VALVE ACTUATING MEANS FOR HYDRAULIC NOMOGRAPHIC MULTIPLIERS

Francis B. Brown, Los Angeles, Calif.

Application June 21, 1945, Serial No. 600,775

4 Claims. (Cl. 137—139)

(Granted under the act of March 3, 1883, as amended April 30, 1928; 370 O. G. 757)

The invention described herein may be manufactured and used by or for the Government for governmental purposes without the payment to of any royalty thereon.

With certain types of computing devices, such as gun fire directors, it is necessary to obtain the product of two or more variables. These variables commonly appear as changes in pressure of an actuating fluid, such as oil. To avoid needless complications, and to simplify and increase the accuracy of the computer, it is highly desirable to multiply or divide the two variables directly and to obtain the result itself in the form of an oil pressure.

Merely as an example, it is more or less conventional to obtain a value of angular deflection or lead of a gun relative to its line of sight, by multipyling the angular rate of movement of the gun by a function of range or time of flight of the projectile. In certain types of gun mounts, train and elevational movements are effected by hydraulic control in which the pressure of oil effective upon the servo-motors is substantially proportional to the rate of angular movement effected thereby. By connecting a mechanism constructed according to my invention so that one unit thereof is directly responsive to said pressure, while another unit is subjected to a pressure proportional to range or time of flight of projectile, a product oil pressure may be obtained that may be directly applied to effect the necessary and correct lead of the gun relatively to the line of sight, without the intervention of manual adjustments. Numerous other uses will occur to those skilled in the art of computers.

It is therefore an object of the invention to provide a calculator or computing mechanism wherein two variables are automatically multiplied and the result obtained as a fluid pressure.

Another object is to provide a computer, wherein the two variables are themselves introduced as fluid pressures.

A further object is to provide a computing instrument, as aforesaid, wherein two points of an isopleth bar are adjusted in accordance with respective logarithmic functions of the variables, while the intermediate portion of the bar controls a cam bar which, in turn, operates a pressure reducing valve in accordance with the position of said cam bar.

Another object is to provide, in combination with a computer or calculator, a novel hydraulic follow-up, whereby one portion of an isopleth bar is adjusted in accordance with a variable fluid pressure.

A still further object is to provide a computing instrument wherein all power for operating the same is derived from fluid pressure so that a smoothly-operating and highly accurate instrument is assured.

Other objects and advantages of my invention will become apparent as the description proceeds.

In the drawings:

Figure 1 is a schematic view showing the two multiplier units together with the product unit all arranged in a preferred relation, Figure 2 is an enlarged schematic view, partly in section, of one of the duplicate multiplier units.

Figure 4 is a view of an isopleth bar suitable for use with the computer and by which the several units interrelated.

Figure 3:
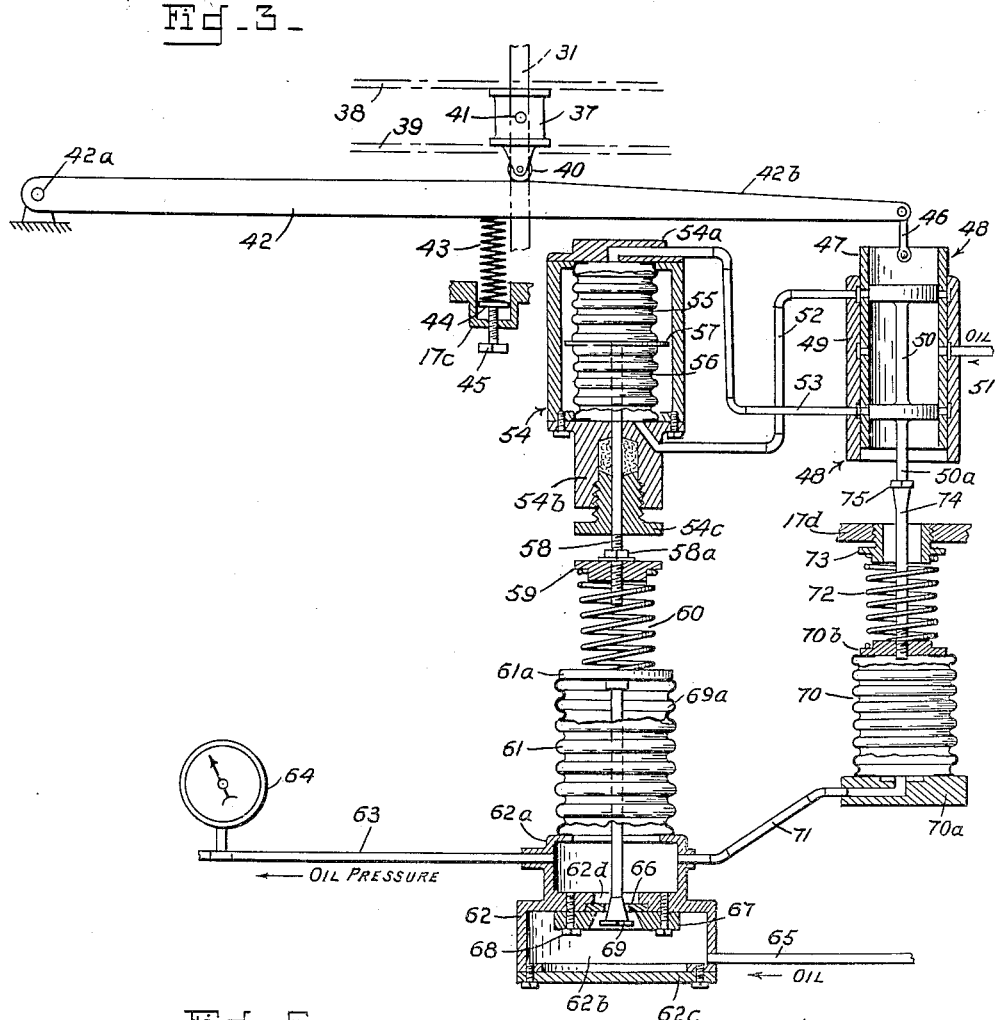
Figure 3 is an enlarged schematic view, partly in section, showing the product unit together with the pressure controlling valve operated thereby.

Referring in detail to Figure 2, a pressure responsive element $10$, shown as a collapsible bellows device or "sylphon" is mounted upon a base $11$ with its interior connected to a source of variable pressure through a pipe $12$. If desired, a pressure gage $13$ may be connected in line $12$, for calibration purposes. The bellows $10$ is closed at its movable end by means of a plate $10a$, attached to one end of a valve rod $14$. A spring $15$ surrounds rod $14$ and urges bellows $10$ into collapsed, or zero pressure position, by exerting a thrust between plate $10a$ and an adjustable abutment plug $16$, threaded into an aperture in a portion $17a$ of the frame of the instrument.

The rod $14$ is attached to a pilot spool $18$ fitting within a sleeve $19$ that, in turn slides within valve cylinder $20$. As is well known in the art, cylinder $20$ has three axially-spaced interior circumferential grooves $20a$, $20b$ and $20c$ each adapted to align with a corresponding one of three series of circumferentially-spaced holes or slots $19a$, $19b$ and $19c$ in sleeve $19$. Central groove $19b$, is connected by a pipe $21$ to a source of pressure fluid, such as oil. When sleeve $19$ is in the position shown at Figure 2, the space within sleeve $19$, defined by the cylindrical ends of pilot spool $18$, is filled with fluid under pressure. The axial dimension of these ends is only slightly greater than the corresponding dimension of holes or slots $19a$ and $19c$, so that, upon very slight movement of spool $18$ upwardly, for example, pressure fluid is admitted to a pipe $22$.

through holes 19a and groove 20a. Similarly, when the spool moves downwardly fluid under pressure is admitted to a pipe 23.

Pipes 22 and 23 are connected to opposite ends of a cylinder 24 of a hydraulic servo-motor 25, closed at one end by a plug 24a and at the other end by a gland 24b. A piston 26 is fitted to reciprocate within cylinder 24 and has a rod 26a extending through gland 24b and attached to a cross-head 27 that may be guided for exact reciprocation by guides 28 and 29. Cross-head 27 carries a cam contact roller 30 and a pin 27a engaging a slot in one end of an isopleth bar 31. A cam arm 32 is pivoted to the frame of the instrument, as at 32a, and has its other end connected by a link or yoke 33, with sleeve 19 whereby said sleeve is reciprocated within cylinder 20 as arm 32 is pivoted. Arm 32 is held in contact with roller 30, by a spring 34 engaging the arm at one end, and an adjustable abutment 35 at the other end. Said abutment may be conveniently adjusted by means of a screw 36 threaded into a portion 17b of the frame of the instrument.

In operation, an increase in pressure, for example, in pipe 12 causes a proportional expansion of bellows 10, resulting in a small translation of pilot spool 18 upwardly to admit pressure fluid from pipe 21 to pipe 22, thus driving piston 26 to the right. Exhaust of pressure fluid from the right end of the cylinder 24, takes place by way of pipe 23 and holes 19c to a sump, not shown. The resulting movement of roller 30 permits cam arm 32 to rise, under the influence of spring 34, to correspondingly move sleeve 19 upwardly by the amount necessary to restore centralized relation between spool 18 and sleeve 19 and cut off further flow of fluid to cylinder 24. Thus, sleeve 19 moves at all times to follow-up spool 18, and, because of the particular shape of the cam edge 32b of arm 32, the position of cross-head 27 and pin 27a is proportional to the logarithm to the base selected, of the pressure existing within pipe 12 and bellows 10. The manner in which the shape of cam edge 32b is determined, will be subsequently explained.

As shown upon Figure 1, two of the units just described, are employed. As these units are preferably identical in size and construction, a description of the other is unnecessary. The basic parts of the other unit have been indicated on Figure 1 by the same reference characters, primed, as have been used on Figure 2. As each pipe 12 and 12' is connected to a separate source of variable pressure, it will be clear that the instrument provides two points, materialized by the pins of the respective cross-heads 27 and 27' and each adjusted from a coordinate axis by an amount proportional to the logarithm of the respective pressure value.

At Figure 3, I have shown in detail the product unit of my calculator. The purpose of this unit is to detect a value proportional to the sum of the displacements of pins 27 and 27' and to convert said sum into a pressure having an arithmetical value equal to the product of the two pressures in pipes 12 and 12'. A cross-head 37 is guided by rails or guides 38 and 39 that are preferably parallel to guides 28 and 29. Cross-head 37 carries a roller 40, and a pin 41 adapted to fit a central hole 31a, Figure 4, of isopleth bar 31.

Roller 40 engages and determines the pivotal position of a cam arm 42, pivoted at 42a to a point on the frame of the instrument. Arm 42 is urged upwardly into contact with roller 40, by means of a spring 43 engaging beneath the arm at one end and an adjustable abutment 44 at the other end. This abutment includes a screw 45 threaded into a socket portion 17c of the instrument frame. The free end of arm 42 is connected by a link 46, with a sleeve 47 of a valve 48. This valve may be similar in construction and operation to valve 20, previously described. It will be sufficient, therefore, merely to identify cylinder 49, spool 50, inlet pipe 51 and outlet pipes 52 and 53.

A control or motor element for the pressure-regulating valve, subsequently to be described, includes a cylindrical casing 54 within which is mounted, a pair of bellows or "sylphon" elements 55 and 56. These elements have their adjacent ends attached to a partition plate 57 that connects these ends for conjoint movement and also prevents the flow of fluid from one bellows to the other. Bellows 55 is in communication with pipe 53 through a cap 54a, secured to one end of casing 54, while bellows 56 is in communication with pipe 52 through a passageway in a combined cap and gland element 54b.

Plate 57 is attached to a rod 58 that extends through the gland plug 54c, and that, at its exterior end, is threaded into an abutment disc 59 and locked in position relatively thereto by a nut 58a. A compression coil spring 60 abuts disc 59 at one end and the closure plate 61a of bellows or "sylphon" 61. The other end of bellows 61 is attached to a valve casing 62 so that its interior is at all times in communication with one chamber 62a of said casing. A pipe 63 leads from chamber 62a, and, if desired, may have a gage 64 therein. A second chamber 62b in casing 62, is closed by a plate 62c. Fluid under pressure is supplied to this chamber from a pipe 65. A valve plate 66 is secured over an opening 62d between chambers 62a and 62b, as by means of a clamping collar 67 and cap screws 68. A valve plug 69 is mounted upon the end of a stem 69a, the other end of said stem being attached to closure plate 61a.

A bellows 70 is mounted below valve 48, as shown at Figure 3, and is supported by a base 70a having a passageway by which the interior of the bellows is connected to chamber 62a, through a pipe 71. The top of bellows 70, is closed by a plate 70b against which a spring 72 abuts. The top end of said spring engages an adjustment collar 73, threaded into an opening in a portion 17d of the instrument frame. A stem 74 is threaded into a central opening in plate 70b and at its upper end is threadedly connected with a stem 50a of spool 50 and secured by a lock nut 75.

In operation of the product unit, as cross-head 37 is moved by the isopleth bar 31, roller 40 moves over the cam edge 42b of arm 42, and causes a corresponding movement thereof. Supposing this movement to be upwardly, sleeve 47 moves accordingly relatively to spool 50, whereby fluid under pressure from pipe 51, is admitted to pipe 53 and bellows 55. At the same time, bellows 56 and pipe 52 are connected to exhaust. Rod 58 is thereby moved downwardly to increase the tension upon spring 60 and to lower plug 69 and thus increase the effective size of the opening in valve plate 66. Pressure in chamber 62a now builds up and the increase is conveyed through pipe 71 to bellows 70 which expands, moving spool 50 upwardly by the amount necessary to cut off communication from pipe 51 to pipe 53. The action is smooth and continuous until equilibrium is established with sleeve 47 and spool 50 in cut-off relation and positioned relatively to cylinder 49 at a new position corresponding to the setting of slide 37. At the same time plug 69 is moved to a position establishing a pressure in chamber 62a and pipe 63 that is definitely related to the new position to which cross-head 37 has been moved.

As will be noted from Figures 1 and 4, the cross-heads 27, 27' and 37 are connected by an isopleth bar 31 having a central bearing hole 31a fitting the pin 41 on cross-head 37, and slots 31b and 31c adjacent respective ends within which the pins on cross-heads 27' and 27 slide. Thus all pins are maintained in alignment and the device may function automatically for the continuous determination of pressures. It will be understood that pipes 21, 21' and 51, may be supplied from a common source of fluid pressure.

The method of obtaining the shape of the cam edge is the same for all arms and will be described in connection with one only.

Figure 5:
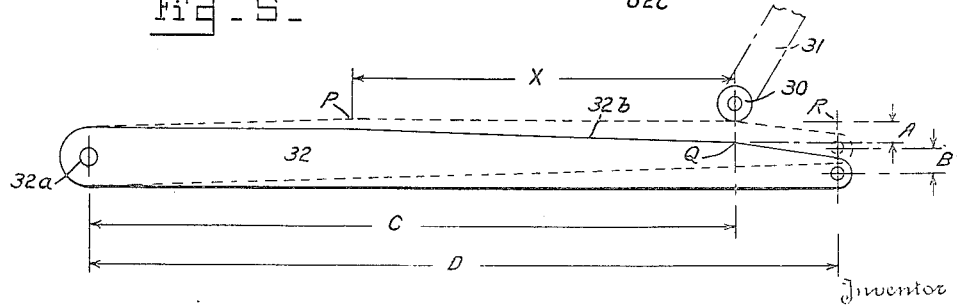
Figure 5 is a diagrammatic view showing the principles involved in determining the shape of the cam arms.

Referring to Figure 5, the cam edge 32b is so shaped that when cross-head roller 30 is moved therealong a distance $x$ from point P along the end of the cam edge to point Q, the resulting upward movement of the point Q will be equal to A while, at the same time the point of pivotal connection of link 33 to the end of arm 32, will move upwardly a distance B. If C is the distance of point Q from the center of pivot 32a, and D is the distance of said pivot center from the point of connection of link 33, then the relation is such that $A/B=C/D$ or $A=BC/D$. Since B is small, it may, by selecting a proper spring, be made a direct function of the oil pressure acting upon "sylphon" 10. D is a constant of the instrument as is obvious from Figure 5, while the distance C is, for each position of isopleth arm 31, the valve of $x$ plus a constant of the instrument. Thus the cam edge is so shaped that, for each particular value of pressure in bellows 10, that is, a particular value of the dimension B, the position of roller 30 has a distance $x$, proportional to the logarithm to the base selected, of said dimension B. Thus, for example, if a logarithmic scale to the base selected were positioned along the path of roller 30, with its unit graduation, corresponding to zero pressure, at point P and the graduation corresponding to the logarithm of the maximum pressure to be encountered, at point R, each position of the pivot axe of roller 30 will correspond to the logarithm of the instantaneous pressure in "sylphon" 10.

Thus the instrument mechanically sets up a conventional nomographic multiplier, and, in accordance with the well known operation of such devices, the pressure in chamber 62a and pipe 63 will, at all times, equal the arithmetical product of the instantaneous pressures in bellows 10 and 10'. I have, therefore, provided a convenient, accurate, and relatively simple mechanism that is readily adapted to all computing instruments in which variables are introduced in the form of fluid pressure. Obviously, any reasonable number of multiplications and divisions may be effected by properly cascading instruments such as that disclosed at Figure 1.

While I have shown my invention in the form now preferred by me, it will be clear to those skilled in this art, that changes, modifications, and substitutions of equivalents are possible, without affecting the basic principles employed. Therefore, I do not wish to be limited to the precise details of construction shown but to reserve all such modifications and changes as fall within the scope of the subjoined claims.

Having now fully disclosed the invention what I wish to claim and secure by Letters Patent is:

1. A computing instrument including an arm pivoted at one end and having a logarithmic cam edge, a double acting valve having relatively translatable parts, one said part being connected with the other end of said cam arm for operation thereby, pressure responsive means connected to operate the other of said valve parts, a pressure-regulating valve, double-acting motor means connected to operate said pressure-regulating valve, fluid pressure connections whereby said first valve controls said motor in response to pivotal movement of said arm, and a fluid pressure connection between said pressure responsive means and said pressure-regulating valve.

2. A computing mechanism including a slide adapted to be positioned by an isopleth arm of said mechanism, a pivoted cam arm having a logarithmic curved edge engaging and positioned by translation of said slide, a first valve having relatively movable parts, a motor connected to be controlled by relative movement of said parts, a pressure-regulating valve connected to be controlled by said motor, and pressure responsive means connected with the variable pressure side of said pressure reducing valve and controlling one of said first valve parts, and a link connecting the end of said arm remote from its pivot with the other of said valve parts.

3. In a unit for a computing instrument, an arm pivoted at one end and having a logarithmic cam edge, a member shiftable to pivot said arm in accordance with the logarithmic function of a pressure value to be determined, a valve comprising a cylinder, a sleeve slidably fitting said cylinder and a piston slidably fitting said sleeve a double acting motor having conduits connected to said valve for control thereby, said arm being connected with said sleeve at a point removed from its pivot to actuate said sleeve to thereby control the admission of pressure fluid to said motor, a pressure regulating valve operated by said motor, and an element responsive to pressure on the reduction side of said pressure regulating valve and connected to actuate said piston to follow up movement of said sleeve.

4. In a calculating instrument, a pressure regulating valve having first and second chambers with an orifice therebetween, a first bellows responsive to pressure in said first chamber, a member operated by said bellows to vary the effective size of said orifice, a motor comprising a pair of opposed bellows, a valve spring adjusted by said opposed bellows to vary the collapsing force on said first bellows, and valve means responsive to pressure in said first chamber for controlling the flow of pressure fluid to said opposed bellows, said second chamber being adapted for connection to a source of fluid pressure.

FRANCIS B. BROWN.

REFERENCES CITED

The following references are of record in the file of this patent:

UNITED STATES PATENTS

| Number | Name | Date |
|---|---|---|
| Re. 20,092 | Mason | Sept. 1, 1936 |
| 1,077,862 | Stafford | Nov. 4, 1913 |
| 1,889,876 | Pellerin et al. | Dec. 6, 1932 |
| 1,962,676 | Albright | May 12, 1934 |

(Other references on following page)

UNITED STATES PATENTS

| Number | Name | Date |
|---|---|---|
| 2,117,800 | Harrison | May 17, 1938 |
| 2,220,176 | Rosenberger | Nov. 5, 1940 |
| 2,220,180 | Spitzglass et al. | Nov. 5, 1940 |
| 2,222,551 | Ziebolz et al. | Nov. 19, 1940 |
| 2,257,905 | Gorrie | Oct. 7, 1941 |
| 2,297,213 | Gosslau | Sept. 13, 1942 |
| 2,317,293 | Newell | Apr. 20, 1943 |
| 2,394,284 | Berges | Feb. 5, 1946 |

FOREIGN PATENTS

| Number | Country | Date |
|---|---|---|
| 291,841 | Great Britain | June 5, 1928 |
| 537,029 | Great Britain | June 5, 1941 |
| 621,465 | France | May 12, 1927 |

OTHER REFERENCES

Ziebolz: Relay Devices, vols. 1 and 2, copyright 1940, published by Askania Regulator Co., Chicago, Illinois.